US 9,553,324 B2

(12) United States Patent
Tanaka et al.

(10) Patent No.: US 9,553,324 B2
(45) Date of Patent: Jan. 24, 2017

(54) FUEL CELL RESIN FRAME EQUIPPED MEMBRANE ELECTRODE ASSEMBLY

(71) Applicant: HONDA MOTOR CO., LTD., Minato-Ku, Tokyo (JP)

(72) Inventors: Yukihito Tanaka, Saitama (JP); Naoki Mitsuta, Nasukarasuyama (JP); Seiji Sugiura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 3 days.

(21) Appl. No.: 14/217,986

(22) Filed: Mar. 18, 2014

(65) Prior Publication Data

US 2014/0287338 A1    Sep. 25, 2014

(30) Foreign Application Priority Data

Mar. 21, 2013  (JP) ................................. 2013-057556

(51) Int. Cl.
*H01M 8/10* (2016.01)
*H01M 8/02* (2016.01)

(52) U.S. Cl.
CPC ......... *H01M 8/1004* (2013.01); *H01M 8/0273* (2013.01); *H01M 8/0284* (2013.01); *H01M 2008/1095* (2013.01); *Y02E 60/521* (2013.01)

(58) Field of Classification Search
CPC .................. H01M 8/02; H01M 8/1004; H01M 2008/1095; H01M 8/0273; Y02E 60/521
See application file for complete search history.

(56) References Cited

U.S. PATENT DOCUMENTS

| 7,993,499 | B2 | 8/2011 | Zuber et al. | |
|---|---|---|---|---|
| 8,343,321 | B2 | 1/2013 | Zuber et al. | |
| 8,394,551 | B2 | 3/2013 | Zuber et al. | |
| 8,703,356 | B2 | 4/2014 | Hayashi | |
| 2003/0175579 | A1* | 9/2003 | Uchida | ............... H01M 4/8605 429/480 |
| 2005/0014056 | A1* | 1/2005 | Zuber et al. | .................... 429/34 |
| 2010/0003580 | A1* | 1/2010 | Shirahama | .......... H01M 8/0276 429/492 |

(Continued)

FOREIGN PATENT DOCUMENTS

DE    11 2005 000 945 T5    2/2007
JP         2007-066766 A    3/2007

(Continued)

OTHER PUBLICATIONS

German Search Report dated Nov. 28, 2014, issued over the corresponding DE Patent Application No. 102014205003.0 with the English translation thereof.

*Primary Examiner* — Miriam Stagg
*Assistant Examiner* — Seenam Agbetiafan
(74) *Attorney, Agent, or Firm* — Carrier Blackman & Associates, P.C.; William D. Blackman; Joseph P. Carrier

(57) ABSTRACT

A resin frame member of a resin frame equipped membrane electrode assembly includes a recess where adhesive is provided. An inner protrusion on an inner side of the recess abuts against an electrode catalyst layer protruding outward beyond a gas diffusion layer of a membrane electrode assembly. An outer protrusion on an outer side of the recess abuts against the outermost portion of a gas diffusion layer of the membrane electrode assembly such that a solid polymer electrolyte membrane is interposed between the outer protrusion and the gas diffusion layer.

7 Claims, 7 Drawing Sheets

(56) References Cited

U.S. PATENT DOCUMENTS

| | | |
|---|---|---|
| 2010/0047649 A1 | 2/2010 | Yamada et al. |
| 2011/0136038 A1* | 6/2011 | Ishida ................ H01M 8/0273 |
| | | 429/480 |
| 2012/0219874 A1 | 8/2012 | Suzuki et al. |

FOREIGN PATENT DOCUMENTS

| | | |
|---|---|---|
| JP | 2008-041337 A | 2/2008 |
| JP | 2009-514144 A | 4/2009 |
| JP | 2011-040290 A | 2/2011 |

* cited by examiner

US 9,553,324 B2

FUEL CELL RESIN FRAME EQUIPPED MEMBRANE ELECTRODE ASSEMBLY

CROSS-REFERENCE TO RELATED APPLICATION

This application is based upon and claims the benefit of priority from Japanese Patent Application No. 2013-057556 filed on Mar. 21, 2013, the contents of which are incorporated herein by reference.

BACKGROUND OF THE INVENTION

Field of the Invention

The present invention relates to a fuel cell resin frame equipped membrane electrode assembly including a stepped MEA and a resin frame member. The MEA includes a first electrode, a second electrode, and a solid polymer electrolyte membrane interposed between the first electrode and the second electrode. The resin frame member is provided around an outer circumference of the MEA.

Description of the Related Art

In general, a solid polymer electrolyte fuel cell employs a solid polymer electrolyte membrane. The solid polymer electrolyte membrane is a solid polymer ion exchange membrane. The fuel cell includes a membrane electrode assembly (MEA) where an anode and a cathode are provided respectively on both sides of the solid polymer electrolyte membrane. Each of the anode and the cathode includes a catalyst layer (electrode catalyst layer) and a gas diffusion layer (porous carbon). In the fuel cell, the membrane electrode assembly is sandwiched between separators (bipolar plates). In use, a predetermined number of fuel cells are stacked together to form a fuel cell stack. For example, the fuel cell stack is mounted in a fuel cell electric vehicle as an in-vehicle fuel cell stack.

In some cases, the membrane electrode assembly has structure where components of the MEA (stepped MEA) have different sizes, i.e., the planar size of one of the gas diffusion layers is smaller than the planar size of the solid polymer electrolyte membrane, and the planar size of the other of the gas diffusion layers is the same as the planar size of the solid polymer electrolyte membrane. In this regard, in order to reduce the amount of relatively expensive material used for the solid polymer electrolyte membrane, and protect the thin solid polymer electrolyte membrane having insufficient strength, for example, a frame equipped MEA including a resin frame member has been adopted as a protection member.

As this type of frame equipped MEA, for example, a membrane electrode assembly disclosed in Japanese Laid-Open Patent Publication No. 2007-066766 is known. As shown in FIG. 7, the membrane electrode assembly includes a membrane 1, an anode catalyst layer 2a provided on one side of the membrane 1, and a cathode catalyst layer 3a provided on the other side of the membrane 1. A GDL (gas diffusion layer) 2b and a GDL 3b are provided on both surfaces of the membrane 1, respectively. The planar size of the GDL 2b on the anode side is larger than the planar size of the GDL 3b on the cathode side.

A gasket structural body 4 is provided in an edge area of the MEA. The gasket structural body 4 is formed by combining gasket layers on the cathode side and the anode side positioned at least in part of an area around the ends of the anode catalyst layer 2a and the cathode catalyst layer 3a (preferably, positioned over the entire area around the ends of the anode catalyst layer 2a and the cathode catalyst layer 3a). At least the outer portion of the membrane 1 on the side (GDL 3b side) where the GDL surface area is smaller is joined to the gasket structural body 4 through an adhesive layer 5.

SUMMARY OF THE INVENTION

However, in Japanese Laid-Open Patent Publication No. 2007-066766, hydrogen peroxide ($H_2O_2$) tends to be produced easily at the border between the outer portion of the GDL 3b having the smaller GDL surface area and the membrane 1, by diffusion of the oxygen-containing gas ($O_2$). Therefore, at the end of the membrane 1, degradation of the membrane 1 tends to occur easily.

The invention has been made to solve the problem of this type, and an object of the present invention is provide a fuel cell resin frame equipped membrane electrode assembly having simple structure in which it is possible to suppress degradation of an end of a solid polymer electrolyte membrane of a stepped MEA having different sizes of components.

The present invention relates to a fuel cell resin frame equipped membrane electrode assembly including a membrane electrode assembly and a resin frame member. The membrane electrode assembly includes a solid polymer electrolyte membrane, a first electrode provided on one surface of the solid polymer electrolyte membrane, and a second electrode provided on the other surface of the solid polymer electrolyte membrane. The first electrode includes a first catalyst layer and a first diffusion layer. The second electrode includes a second catalyst layer and a second diffusion layer. The planar size of the first electrode is larger than the planar size of the second electrode. The resin frame member is provided around an outer circumference of the solid polymer electrolyte membrane.

In the fuel cell resin frame equipped membrane electrode assembly, the resin frame member includes an inner extension extending toward the second electrode, the inner extension has a contact surface which contacts the membrane electrode assembly, with a recess being formed in the contact surface. Adhesive is provided in the recess. An inner protrusion is provided at the recess on an inner end side of the resin frame member, and an outer protrusion is provided at the recess on an outer end side of the resin frame member. The inner protrusion abuts against the second catalyst layer protruding outward beyond the second diffusion layer of the membrane electrode assembly, and the outer protrusion abuts against the outermost portion of the first diffusion layer of the membrane electrode assembly such that the solid polymer electrolyte membrane is interposed between the outer protrusion and the first diffusion layer.

In the present invention, the inner protrusion of the resin frame member abuts against the second catalyst layer which protrudes outward beyond the second diffusion layer of the membrane electrode assembly. In the structure, it becomes possible to suitably suppress diffusion of the oxygen-containing gas toward the end of the solid polymer electrolyte membrane. Therefore, it is possible to effectively prevent a generation of degradation reaction at the end of the solid polymer electrolyte membrane. Thus, with the simple structure, it becomes possible to suppress degradation of the end of the solid polymer electrolyte membrane of the stepped MEA as much as possible.

Further, the outer protrusion of the resin frame member abuts against the outermost portion of the first gas diffusion layer of the membrane electrode assembly such that the solid polymer electrolyte membrane is interposed between the outer protrusion and the first gas diffusion layer. In the structure, the components of the resin frame equipped membrane electrode assembly can be retained together reliably.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
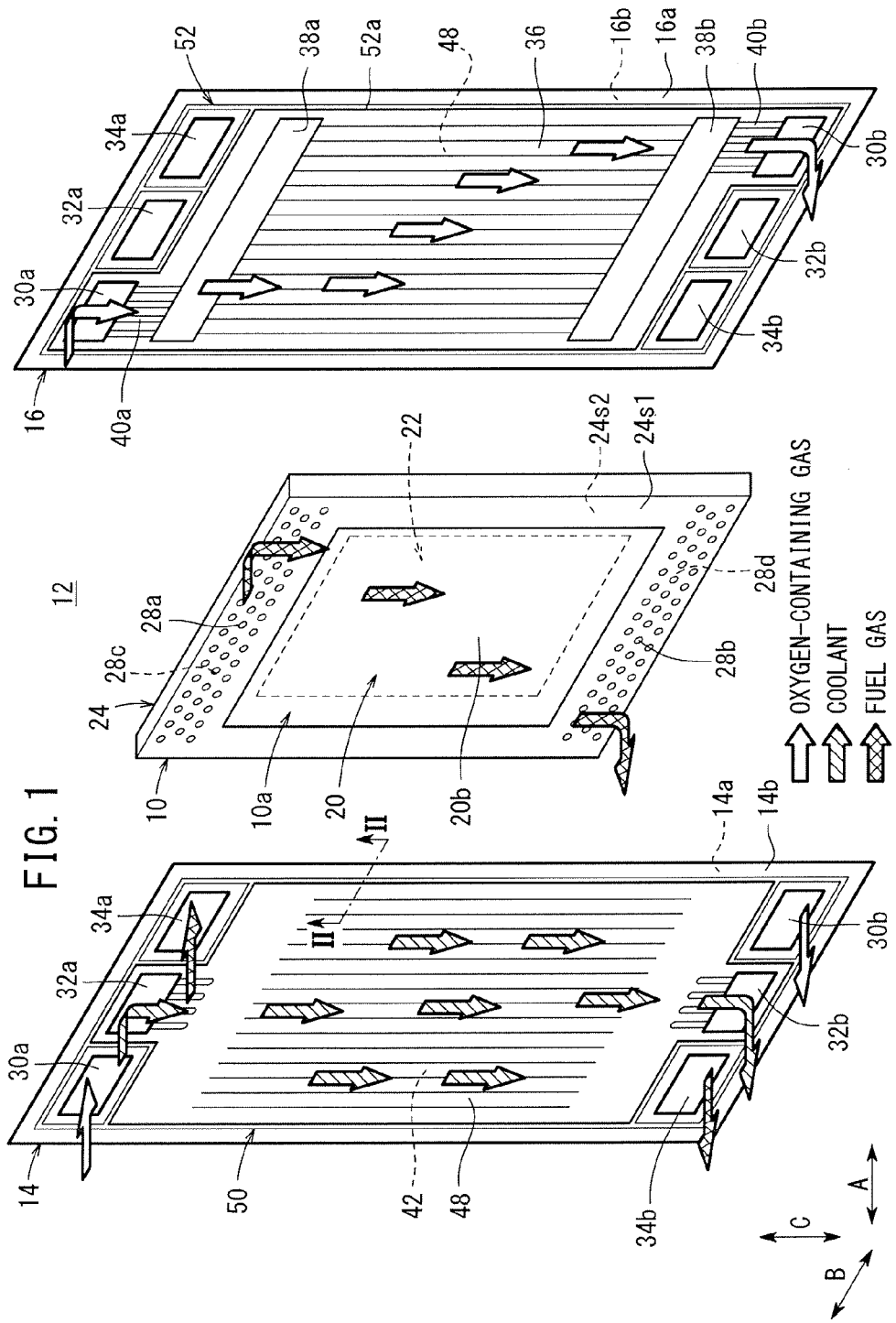
FIG. 1 is an exploded perspective view showing main components of a solid polymer electrolyte fuel cell including a resin frame equipped membrane electrode assembly according to an embodiment of the present invention.
Figure 2:
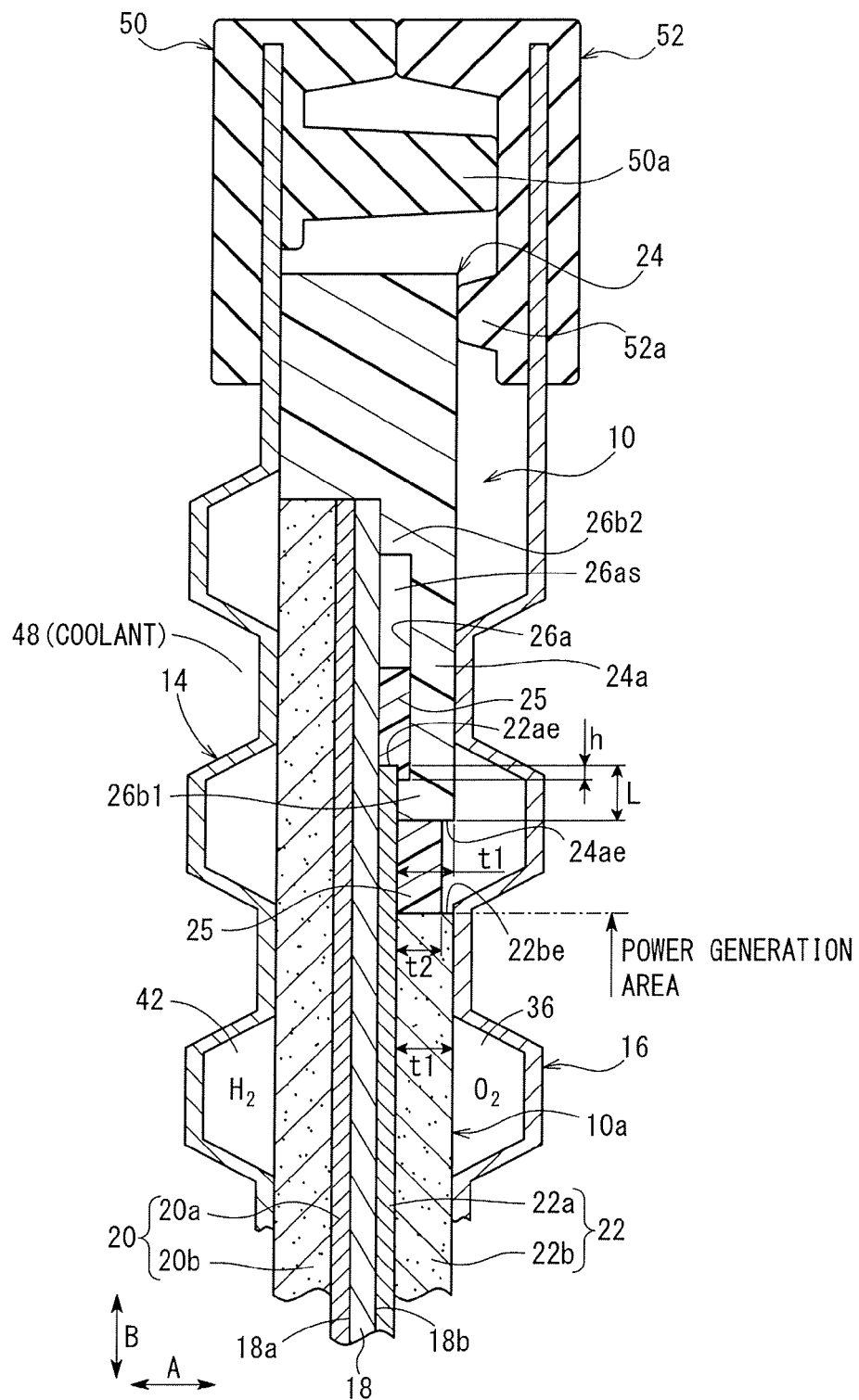
FIG. 2 is a cross sectional view showing the fuel cell, taken along a line II-II in FIG. 1.

As shown in FIGS. 1 and 2, a resin frame equipped membrane electrode assembly 10 according to an embodiment of the present invention is included in a solid polymer electrolyte fuel cell 12 having a rectangular shape elongated in a longitudinal direction (or elongated in a lateral direction). A plurality of the fuel cells 12 are stacked together in a direction indicated by an arrow A (in a horizontal direction) or in a direction indicated by an arrow C (in a gravity direction). For example, the fuel cell stack is mounted in a fuel cell electric vehicle (not shown) as an in-vehicle fuel cell stack.

The fuel cell 12 includes the resin frame equipped membrane electrode assembly 10, and a first separator 14 and a second separator 16 sandwiching the resin frame equipped membrane electrode assembly 10. The first separator 14 and the second separator 16 each have a rectangular shape elongated in a longitudinal direction (or elongated in a lateral direction), and are made of, for example, metal plates such as steel plates, stainless steel plates, aluminum plates, plated steel sheets, or metal plates having anti-corrosive surfaces by surface treatment. Alternatively, carbon members or the like may be used as the first separator 14 and the second separator 16.

Figure 3:
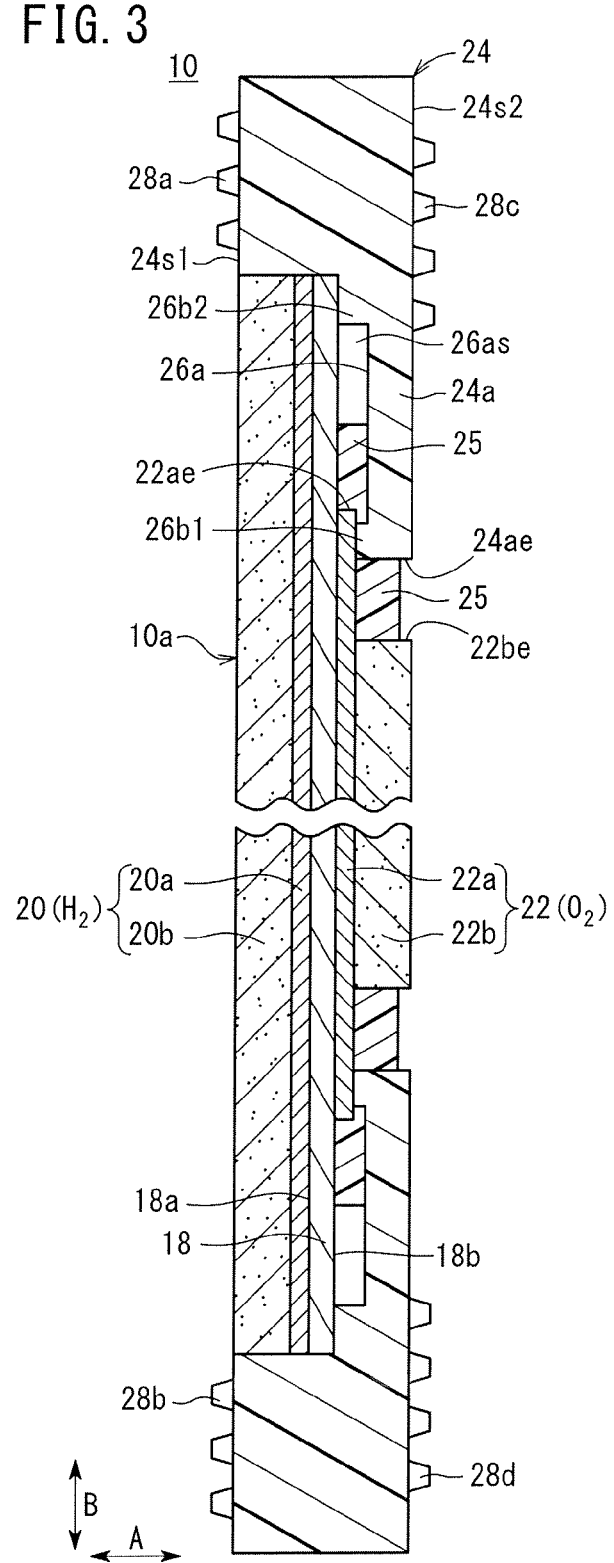
FIG. 3 is a cross sectional view showing main components of the resin frame equipped membrane electrode assembly.

As shown in FIGS. 2 and 3, the rectangular resin frame equipped membrane electrode assembly 10 has a membrane electrode assembly central section 10a. The membrane electrode assembly central section 10a includes a solid polymer electrolyte membrane 18, and an anode (first electrode) 20 and a cathode (second electrode) 22 sandwiching the solid polymer electrolyte membrane 18. The solid polymer electrolyte membrane 18 is formed by impregnating a thin membrane of perfluorosulfonic acid with water, for example.

A fluorine based electrolyte may be used as the solid polymer electrolyte membrane 18. Alternatively, an HC (hydrocarbon) based electrolyte may be used as the solid polymer electrolyte membrane 18. The surface size (planar size) of the cathode 22 is smaller than the surface sizes (planar sizes) of the solid polymer electrolyte membrane 18 and the anode 20.

Instead of the above structure, it is possible to adopt structure where the surface size (planar size) of the anode 20 is smaller than the surface sizes (planar sizes) of the solid polymer electrolyte membrane 18 and the cathode 22. In this case, the anode 20 is the second electrode, and the cathode 22 is the first electrode.

The anode 20 includes an electrode catalyst layer (first catalyst layer) 20a joined to one surface 18a of the solid polymer electrolyte membrane 18, and a gas diffusion layer (first diffusion layer) 20b stacked on the electrode catalyst layer 20a. The electrode catalyst layer 20a and the gas diffusion layer 20b have the same outer size. The outer sizes of the electrode catalyst layer 20a and the gas diffusion layer 20b are the same as (or less than) the outer size of the solid polymer electrolyte membrane 18. Incidentally, the outer size of the electrode catalyst layer 20a may be different from that of the gas diffusion layer 20b or the solid polymer electrolyte membrane 18.

The cathode 22 includes an electrode catalyst layer (second catalyst layer) 22a joined to the other surface 18b of the solid polymer electrolyte membrane 18, and a gas diffusion layer (second diffusion layer) 22b stacked on the electrode catalyst layer 22a. An outer end 22ae of the electrode catalyst layer 22a protrudes outward beyond an outer end 22be of the gas diffusion layer 22b, and the outer size of the electrode catalyst layer 22a is smaller than the outer size of the solid polymer electrolyte membrane 18.

Each of the electrode catalyst layers 20a, 22a is formed, for example, by carbon black supporting platinum particles as catalyst particles. As an ion conductive binder, polymer electrolyte is used. Catalyst paste formed by mixing the catalyst particles uniformly in the solution of this polymer electrolyte is printed, applied, or transferred on both surfaces of the solid polymer electrolyte membrane 18 to form the electrode catalyst layers 20a, 22a. Each of the gas diffusion layers 20b, 22b is made of a carbon paper or the like, and the planar size of the gas diffusion layer 22b is smaller than the planar size of the gas diffusion layer 20b.

As shown in FIGS. 1 to 4, the resin frame equipped membrane electrode assembly 10 includes a resin frame member 24 provided around an outer circumference of the solid polymer electrolyte membrane 18, and joined to the anode 20 and the cathode 22. For example, the resin frame member 24 is made of PPS (polyphenylene sulfide), PPA (polyphthalamide), PEN (polyethylene naphtalate), PES (polyethersulfone), LCP (liquid crystal polymer), PVDF (polyvinylidene difluoride), a silicone rubber, a fluoro rubber, or an EPDM (ethylene propylene diene monomer).

A thin inner extension 24a protruding toward the outer side of the cathode 22 is provided in the inner portion of the resin frame member 24. The thickness of the inner extension 24a is the same as the thickness of the cathode 22. In effect, the thickness of the inner extension 24a is the same as the thickness t1 of the gas diffusion layer 22b (in the case where an intermediate layer is provided on the gas diffusion layer 22b, the thickness of the intermediate layer is added).

The inner extension 24a has an enclosed recess 26a on a contact surface which contacts the membrane electrode assembly central section 10a, and adhesive 25 is provided in the recess 26a. An inner protrusion 26b1 is provided at the innermost end of the inner extension 24a below the recess 26a, on an inner end side of the resin frame member 24, and an outer protrusion 26b2 is provided above the recess 26a, on an outer end side of the resin frame member 24. No adhesive is applied to the inner protrusion 26b1 and the outer protrusion 26b2. The outer end 22ae of the electrode catalyst layer 22a protrudes into the recess 26a by a distance h. The thickness of the outer protrusion 26b2 is thicker than the thickness t1 of the inner protrusion 26b1 by the thickness of the electrode catalyst layer 22a.

The inner protrusion 26b1 abuts against the electrode catalyst layer 22a which protrudes radially outward beyond the gas diffusion layer 22b of the membrane electrode assembly central section 10a. The outer protrusion 26b2 abuts against the outermost portion of the gas diffusion layer 20b of the membrane electrode assembly central section 10a such that the solid polymer electrolyte membrane 18 is interposed between the outer protrusion 26b2 and the gas diffusion layer 20b.

The recess 26a includes a space 26as adjacent to the outer protrusion 26b2, and the space 26as is not filled with the adhesive 25. The width dimension L of contact between the inner protrusion 26b1 and the electrode catalyst layer 22a is set to a value ranging from 0.2 mm to 3.0 mm, and the outer portion of the electrode catalyst layer 22a and the inner extension 24a of the resin frame member 24 are overlapped with each other to form an overlapped portion over the entire circumference.

A gap is formed between an inner end 24ae of the resin frame member 24 and the outer end 22be of the gas diffusion layer 22b. A layer of the adhesive 25 having the thickness t2 of 70 μm or more in the thickness direction of the inner extension 24a is formed in the gap. In the structure, the electrode catalyst layer 22a is not exposed to the outside. The thickness t2 of the adhesive 25 is determined such that the adhesive 25 does not protrudes from the outer surface of the gas diffusion layer 22b, i.e., the thickness t2 is the thickness t1 of the gas diffusion layer 22b or less (t1≥t2).

The inner extension 24a of the resin frame member 24 and the membrane electrode assembly central section 10a are adhered to each other by the layer of the adhesive 25. The layer of the adhesive 25 is formed in a frame shape over the entire circumference of the outer edge portion of the solid polymer electrolyte membrane 18. As the adhesive 25, for example, fluorine based adhesive is used.

Figure 4:
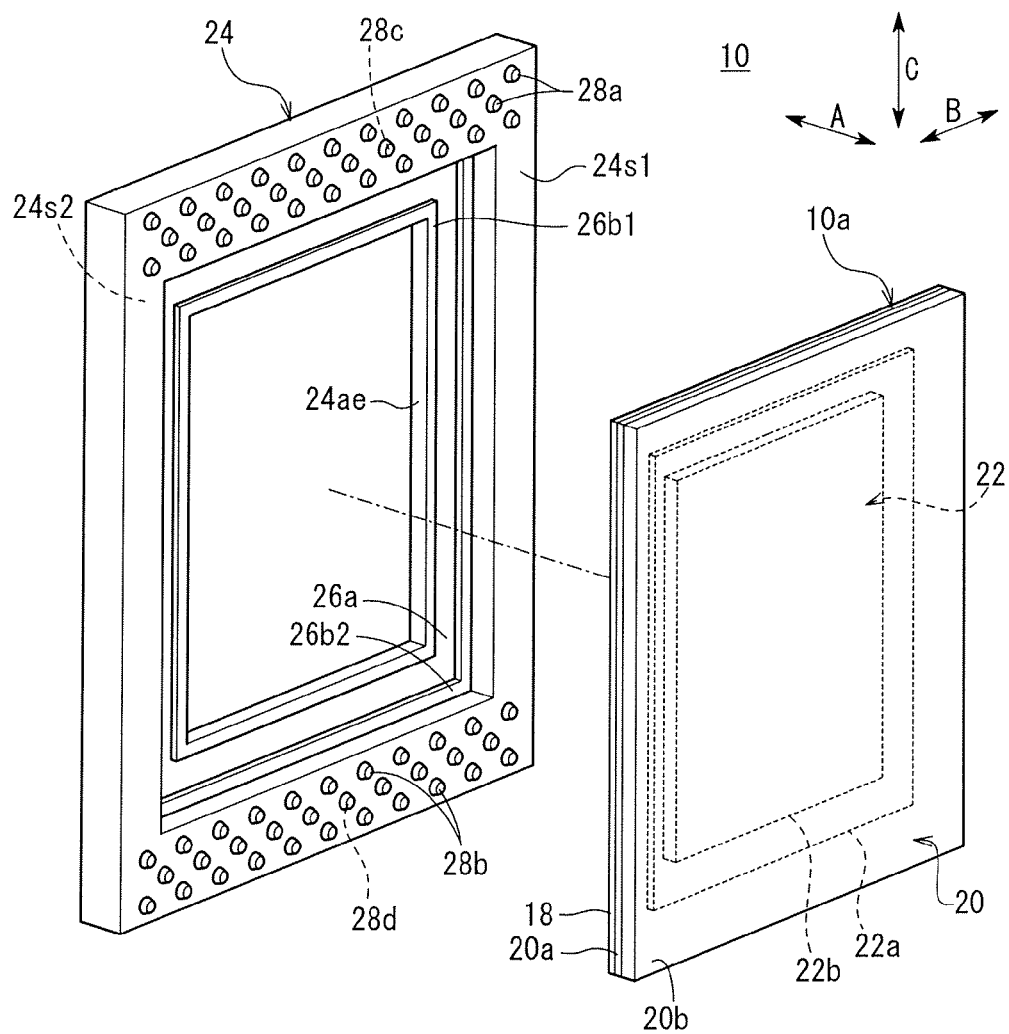
FIG. 4 is an exploded perspective view showing the resin frame equipped membrane electrode assembly.

As shown in FIGS. 1 and 4, an inlet buffer 28a corresponding to the inlet of a fuel gas flow field 42 described later is provided on an upper edge portion of a surface 24s1 of the resin frame member 24 where the anode 20 is present. An outlet buffer 28b corresponding to the outlet of the fuel gas flow field 42 is provided on a lower edge portion of the surface 24s1 of the resin frame member 24. The inlet buffer 28a and the outlet buffer 28b are formed by a plurality of projections (columnar portions).

As shown in FIG. 3, an inlet buffer 28c corresponding to the inlet of an oxygen-containing gas flow field 36 described later is provided on a surface 24s2 of the resin frame member 24 where the cathode 22 is present, in the outer marginal end of the resin frame member 24. An outlet buffer 28d corresponding to the outlet of the oxygen-containing gas flow field 36 is provided on the surface 24s2 of the resin frame member 24, in the lower marginal end of the resin frame member 24. The inlet buffer 28c and the outlet buffer 28d are formed by a plurality of projections (columnar portions).

As shown in FIG. 1, at an upper edge portion of the fuel cell 12 in the direction indicated by the arrow C (gravity direction in FIG. 1), an oxygen-containing gas supply passage 30a for supplying an oxygen-containing gas, a coolant supply passage 32a for supplying a coolant, a fuel gas supply passage 34a for supplying a fuel gas such as a hydrogen-containing gas are arranged in the horizontal direction indicated by the arrow B. The oxygen-containing gas supply passage 30a, the coolant supply passage 32a, and the fuel gas supply passage 34a extend through the fuel cell 12 in the stacking direction indicated by the arrow A.

At a lower edge portion of the fuel cell 12 in the direction indicated by the arrow C, a fuel gas discharge passage 34b for discharging the fuel gas, a coolant discharge passage 32b for discharging the coolant, and an oxygen-containing gas discharge passage 30b for discharging the oxygen-containing gas are arranged in the direction indicated by the arrow B. The fuel gas discharge passage 34b, the coolant discharge passage 32b, and the oxygen-containing gas discharge passage 30b extend through the fuel cell 12 in the direction indicated by the arrow A.

The second separator 16 has the oxygen-containing gas flow field 36 on its surface 16a facing the resin frame equipped membrane electrode assembly 10. The oxygen-containing gas flow field 36 is connected to the oxygen-containing gas supply passage 30a and the oxygen-containing gas discharge passage 30b. A substantially-flat buffer area 38a is provided at an inlet (upper end side) of the oxygen-containing gas flow field 36. The inlet buffer 28c provided in the upper edge portion of the surface 24s2 of the resin frame member 24 abuts against the buffer area 38a. An inlet connection channel 40a including a plurality of grooves extending from the oxygen-containing gas supply passage 30a is connected to one end of the buffer area 38a on the upper side.

A substantially-flat buffer area 38b is provided at an outlet (lower end side) of the oxygen-containing gas flow field 36. The outlet buffer 28d provided in the lower edge portion of the surface 24s2 of the resin frame member 24 contacts the buffer area 38b. An outlet connection channel 40b including a plurality of grooves extending from the oxygen-containing gas discharge passage 30b is connected to one end of the buffer area 38b on the lower side.

Figure 5:
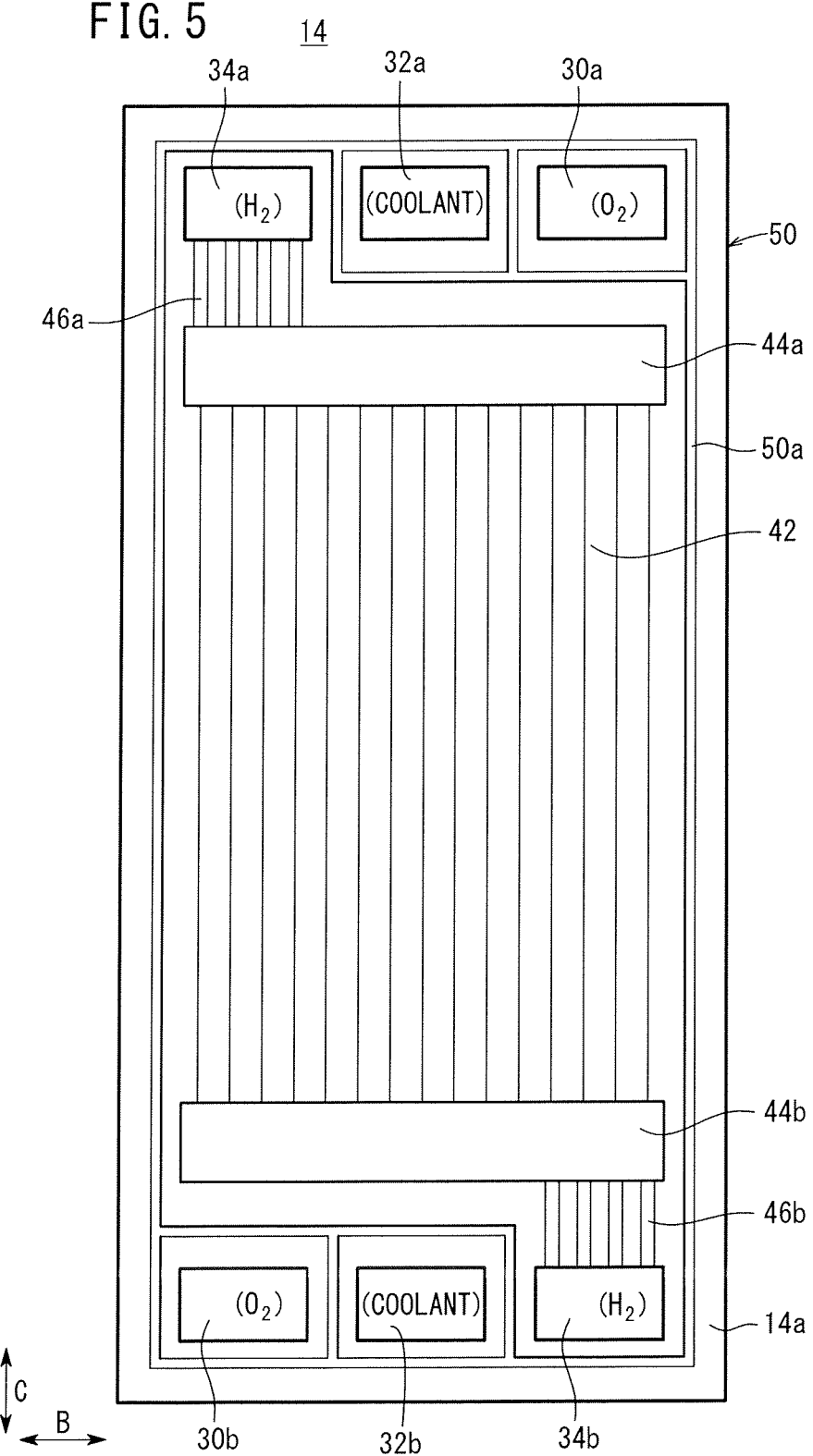
FIG. 5 is a front view showing a first separator of the fuel cell.

As shown in FIG. 5, the first separator 14 has the fuel gas flow field 42 on its surface 14a facing the resin frame equipped membrane electrode assembly 10. The fuel gas flow field 42 extends in the direction indicated by the arrow C. A substantially-flat buffer area 44a is provided at an inlet (upper end side) of the fuel gas flow field 42. The inlet buffer 28a provided in the upper edge portion of the surface 24s1 of the resin frame member 24 contacts the buffer area 44a. An inlet connection channel 46a including a plurality of grooves extending from the fuel gas supply passage 34a is connected to one end of the buffer area 44a on the upper side.

A substantially-flat buffer area 44b is provided at an outlet (lower end side) of the fuel gas flow field 42. The outlet buffer 28b provided in the lower edge portion of the surface 24s1 of the resin frame member 24 abuts against the buffer area 44b. An outlet connection channel 46b including a plurality of grooves extending from the fuel gas discharge passage 34b is connected to one end of the buffer area 44b on the lower side. A coolant flow field 48 is formed between the surface 14b of the first separator 14 and the surface 16b of the second separator 16. The coolant flow field 48 is connected to the coolant supply passage 32a and the coolant discharge passage 32b.

As shown in FIGS. 1 and 2, a first seal member 50 is formed integrally with the surfaces 14a, 14b of the first separator 14, around the outer end of the first separator 14. A second seal member 52 is formed integrally with the surfaces 16a, 16b of the second separator 16, around the outer end of the second separator 16.

As shown in FIG. 2, the first seal member 50 includes a ridge seal 50a which abuts against the second seal member 52, and the second seal member 52 includes a ridge seal 52a which abuts against the resin frame member 24 of the resin frame equipped membrane electrode assembly 10. Each of the first seal member 50 and the second seal member 52 includes a flat seal extending flatly along the separator surface.

Each of the first seal member 50 and the second seal members 52 is made, for example, of resilient seal material, cushion material, or packing material such as an EPDM (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

Next, operation of the fuel cell 12 will be described below in conjunction with the resin frame equipped membrane electrode assembly 10 according to the embodiment of the present invention.

Firstly, as shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, or oil is supplied to the coolant supply passage 32a.

Thus, the oxygen-containing gas flows from the oxygen-containing gas supply passage 30a to the oxygen-containing gas flow field 36 of the second separator 16. The oxygen-containing gas moves in the direction indicated by the arrow C, and the oxygen-containing gas is supplied to the cathode 22 of the membrane electrode assembly 10a. In the meanwhile, the fuel gas flows from the fuel gas supply passage 34a into the fuel gas flow field 42 of the first separator 14. The fuel gas flows along the fuel gas flow field 42 in the direction indicated by the arrow C, and the fuel gas is supplied to the anode 20 of the membrane electrode assembly 10a.

Thus, in each of the membrane electrode assemblies 10a, the oxygen-containing gas supplied to the cathode 22 and the fuel gas supplied to the anode 20 are partially consumed in the electrochemical reactions in the electrode catalyst layers for generating electricity.

Then, the oxygen-containing gas partially consumed at the cathode 22 flows along the oxygen-containing gas discharge passage 30b, and the oxygen-containing gas is discharged in the direction indicated by the arrow A. Likewise, the fuel gas partially consumed at the anode 20 flows along the fuel gas discharge passage 34b, and the fuel gas is discharged in the direction indicated by the arrow A.

Further, the coolant supplied to the coolant supply passage 32a flows into the coolant flow field 48 between the first separator 14 and the second separator 16. Then, the coolant flows in the direction indicated by the arrow C. After the coolant cools the membrane electrode assembly 10a, the coolant is discharged into the coolant discharge passage 32b.

In the embodiment of the present invention, as shown in FIGS. 2 and 3, the inner protrusion 26b1 of the resin frame member 24 abuts against the entire circumference of the electrode catalyst layer 22a which protrudes outward beyond the gas diffusion layer 22b of the membrane electrode assembly 10a. In the structure, it becomes possible to suitably suppress diffusion of the oxygen-containing gas (oxygen in the air) toward the end (outer circumference) of the solid polymer electrolyte membrane 18. Therefore, it is possible to prevent a generation of degradation reaction at the end (outer circumference) of the solid polymer electrolyte membrane 18. Thus, with the simple structure, it becomes possible to suppress degradation of the end of the solid polymer electrolyte membrane 18 of the stepped MEA as much as possible.

Figure 6:
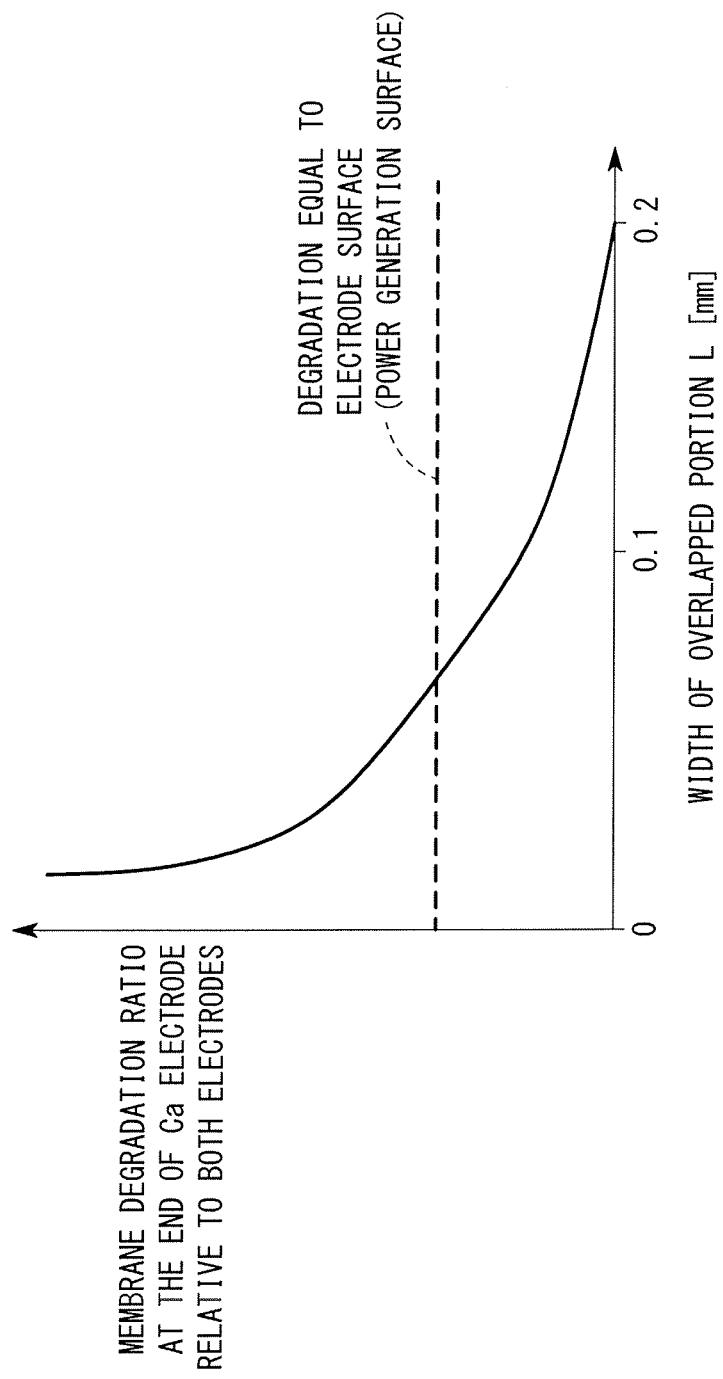
FIG. 6 is a graph showing the relationship between the width of an overlapped portion and the degradation ratio at the end of a cathode.
Figure 7:
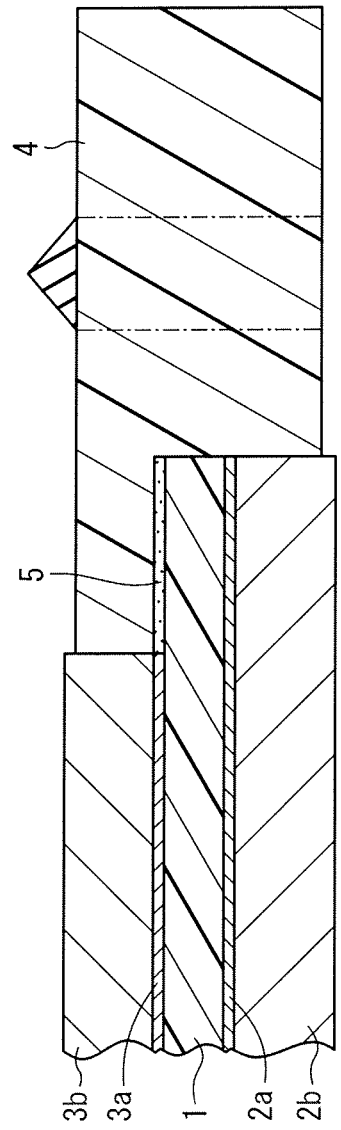
FIG. 7 is a view showing a membrane electrode assembly disclosed in Japanese Laid-Open Patent Publication No. 2007-066766.

Further, the width dimension L of contact between the inner protrusion 26b1 and the electrode catalyst layer 22a (i.e., width of the overlapped portion) is set to 0.2 mm or more. FIG. 6 shows the relationship between the width L of the overlapped portion and degradation of the membrane. In FIG. 6, in the case where the anode 20 and the cathode 22 are provided on both sides of the solid polymer electrolyte membrane 18, the vertical axis shows the degradation ratio of the solid polymer electrolyte membrane 18 at the end of the cathode 22 relative to the degradation quantity of the solid polymer electrolyte membrane 18 (decrease in the thickness of the solid polymer electrolyte membrane 18). As described above, the width L of the overlapped portion is set to 0.2 mm or more in consideration of diffusion of the oxygen-containing gas in the electrode catalyst layer 22a, whereby degradation of the solid polymer electrolyte membrane 18 is suppressed reliably.

Further, the outer protrusion 26b2 of the resin frame member 24 abuts against the outermost portion of the gas diffusion layer 20b of the membrane electrode assembly 10a such that the solid polymer electrolyte membrane 18 is interposed between the outer protrusion 26b2 and the gas diffusion layer 20b. In the structure, components of the resin frame equipped membrane electrode assembly 10 are held together reliably.

Further, the recess 26a includes the space 26as adjacent to the outer protrusion 26b2, and the space 26as is not filled with the adhesive 25. Therefore, the adhesive 25 can be used economically. Further, the adhesive 25 is prevented from being undesirably attached to the outer protrusion 26b2, and overflow of the adhesive to the outside is also prevented from occurring.

Further, the gap is formed between the inner end 24ae of the resin frame member 24 and the outer end 22be of the gas diffusion layer 22b. The layer of the adhesive 25 having the thickness t2 of 70 μm or more in the thickness direction of the inner extension 24a is formed in the gap. In the structure, formation of membrane wrinkles due to the size change of the solid polymer electrolyte membrane 18 is suppressed, and the reaction force due to drying of the membrane is received reliably. It becomes possible to suppress deformation of the overall resin frame equipped membrane electrode assembly 10 suitably.

While the invention has been particularly shown and described with reference to a preferred embodiment, it will be understood that variations and modifications can be effected thereto by those skilled in the art without departing from the scope of the invention as defined by the appended claims.

What is claimed is:

1. A fuel cell resin frame equipped membrane electrode assembly comprising:
   a membrane electrode assembly central section including a solid polymer electrolyte membrane, a first electrode provided on one surface of the solid polymer electrolyte membrane, and a second electrode provided on another surface of the solid polymer electrolyte membrane, the first electrode including a first catalyst layer and a first diffusion layer, the second electrode including a second catalyst layer and a second diffusion layer, said second catalyst layer protruding outwardly beyond the second diffusion layer, and a planar size of the first electrode being larger than a planar size of the second electrode; and a resin frame member provided around an outer circumference of the solid polymer electrolyte membrane, wherein the resin frame member includes an inner extension extending inwardly beyond an outer edge of the second catalyst layer, the inner extension having a contact surface, a portion of which contacts a surface of the second catalyst layer facing toward the second diffusion layer of the membrane electrode assembly central section, the inner extension configured to substantially suppress diffusion of gases therepast toward the solid polymer electrolyte membrane, with an enclosed recess being formed between the polymer electrolyte membrane and the contact surface, and an adhesive is provided in a portion of the recess, the adhesive contacting part of the surface of the second catalyst layer facing toward the second diffusion layer, and also contacting the outer edge of the second catalyst layer;

an inner protrusion, as an integral part of the resin frame member, is provided adjacent the recess on an inner end side of the inner extension; and an outer protrusion, as an integral part of the resin frame member, is provided adjacent the recess on an outer end side of the resin frame member; and the inner protrusion abuts against the second catalyst layer at a portion of the second electrode protruding outward beyond and spaced away from the second diffusion layer of the membrane electrode assembly central section, and the outer protrusion abuttingly contacts an outermost portion of the first diffusion layer of the membrane electrode assembly central section, and wherein a portion of the solid polymer electrolyte membrane is interposed between a portion of the outer protrusion and the first diffusion layer.

2. The fuel cell resin frame equipped membrane electrode assembly according to claim 1, wherein the recess includes a space adjacent to the outer protrusion, and the space is not filled with the adhesive.

3. The fuel cell resin frame equipped membrane electrode assembly according to claim 1, wherein a width dimension of contact between the inner protrusion and the second catalyst layer is set to 0.2 mm or more.

4. The fuel cell resin frame equipped membrane electrode assembly according to claim 1, wherein a gap is formed between an inner end of the inner extension and an outer end of the second diffusion layer, and a layer of the adhesive is provided in the gap.

5. The fuel cell resin frame equipped membrane electrode assembly of claim 1, wherein the resin frame member is formed from a material selected from the group consisting of PPS (polyphenylene sulfide), PPA (polyphthalamide), PEN (polyethylene naphtalate), PES (polyethersulfone), LCP (liquid crystal polymer), PVDF (polyvinylidene difluoride), a silicone rubber, a fluoro rubber, and EPDM (ethylene propylene diene monomer).

6. A fuel cell resin frame equipped membrane electrode assembly comprising:

a membrane electrode assembly central section including a solid polymer electrolyte membrane, a first electrode provided on one surface of the solid polymer electrolyte membrane, and a second electrode provided on another surface of the solid polymer electrolyte membrane, the first electrode including a first catalyst layer and a first diffusion layer, the second electrode including a second catalyst layer and a second diffusion layer, said second catalyst layer including a portion protruding outwardly beyond the second diffusion layer, and a planar size of the first electrode being larger than a planar size of the second electrode; and a resin frame member provided around an outer circumference of the solid polymer electrolyte membrane, wherein the resin frame member includes an inner extension extending inwardly beyond an outer edge of the second catalyst layer, the inner extension having a contact surface which contacts the second catalyst layer facing toward the second diffusion layer of the membrane electrode assembly central section, the inner extension configured to substantially suppress diffusion of gases therepast toward the solid polymer electrolyte membrane, with an enclosed recess being formed between the polymer electrolyte membrane and the contact surface, and an adhesive is provided in a portion of the recess, the adhesive contacting part of the surface of the second catalyst layer facing toward the second diffusion layer, and also contacting the outer edge of the second catalyst layer;

an inner protrusion, as an integral part of the resin frame member, at the recess on an inner end side of the resin frame member; and the inner protrusion abuttingly contacts the portion of the second catalyst layer protruding outward beyond the second diffusion layer of the membrane electrode assembly central section.

7. A fuel cell resin frame equipped membrane electrode assembly comprising:

a membrane electrode assembly central section including a solid polymer electrolyte membrane, a first electrode provided on one surface of the solid polymer electrolyte membrane, and a second electrode provided on another surface of the solid polymer electrolyte membrane, the first electrode including a first catalyst layer and a first diffusion layer, the second electrode including a second catalyst layer and a second diffusion layer, said second catalyst layer including a portion protruding outwardly beyond the second diffusion layer, and a planar size of the first electrode being larger than a planar size of the second electrode; and a resin frame member provided around an outer circumference of the solid polymer electrolyte membrane, wherein the resin frame member includes an inner extension extending inwardly beyond an outer edge of the second catalyst layer, the inner extension configured to substantially suppress diffusion of gases therepast toward the solid polymer electrolyte membrane, the inner extension having a contact surface, a portion of which contacts the second catalyst layer of the membrane electrode assembly central section, with an enclosed recess being formed between the polymer electrolyte membrane and the contact surface, and an adhesive is provided in a portion of the recess; the adhesive contacting part of the surface of the second catalyst layer facing toward the second diffusion layer, and also contacting the outer edge of the second catalyst layer;

an outer protrusion, as an integral part of the resin frame member, is provided at the recess on an outer end side of the resin frame member; and the outer protrusion abuttingly contacts the outermost portion of the first diffusion layer of the membrane electrode assembly central section such that the solid polymer electrolyte membrane is interposed between a portion of the outer protrusion and the first diffusion layer.

* * * * *